United States Patent
Horiuchi et al.

(10) Patent No.: US 9,738,803 B2
(45) Date of Patent: Aug. 22, 2017

(54) AQUEOUS INK, INK CARTRIDGE, AND INK JET RECORDING METHOD

(71) Applicant: CANON KABUSHIKI KAISHA, Tokyo (JP)

(72) Inventors: Takayuki Horiuchi, Kawasaki (JP); Satoru Kobayashi, Yokohama (JP); Masanori Yoshida, Chiba (JP); Shuichiro Tanimoto, Aki-gun (JP); Naofumi Shimomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/148,218

(22) Filed: May 6, 2016

(65) Prior Publication Data

US 2016/0340530 A1    Nov. 24, 2016

(30) Foreign Application Priority Data

May 21, 2015    (JP) ................................ 2015-103524

(51) Int. Cl.
*C09D 11/30* (2014.01)
*C09D 133/12* (2006.01)
(Continued)

(52) U.S. Cl.
CPC ........... *C09D 11/30* (2013.01); *B41J 2/17503* (2013.01); *C09D 11/10* (2013.01); *C09D 11/106* (2013.01); *C09D 133/10* (2013.01); *C09D 133/12* (2013.01)

(58) Field of Classification Search
None
See application file for complete search history.

(56) References Cited

U.S. PATENT DOCUMENTS

| 6,057,384 A | 5/2000 | Nguyen et al. |
| 8,282,725 B2 | 10/2012 | Shimomura et al. |

(Continued)

FOREIGN PATENT DOCUMENTS

| EP | 1 035 179 A1 | 9/2000 |
| JP | 2008-179778 A | 8/2008 |

(Continued)

OTHER PUBLICATIONS

Sep. 30, 2016 European Search Report in European Patent Appln. No. 16001070.8.

*Primary Examiner* — An Do
*Assistant Examiner* — Renee I Wilson
(74) *Attorney, Agent, or Firm* — Fitzpatrick, Cella, Harper & Scinto

(57) ABSTRACT

An aqueous ink for ink jet including a resin particle. The resin particle includes a first layer and a second layer in this order from the inside to the outside thereof. The first layer is composed of a first resin, wherein the proportion of a unit derived from an aromatic-group-containing ethylenically unsaturated monomer in the first resin is 10% by mass or less. The second layer has a tetrahydrofuran-insoluble fraction of 10% by mass or more and is composed of a second resin having a unit derived from an aromatic-group-containing ethylenically unsaturated monomer and a unit derived from an ionic-group-containing ethylenically unsaturated monomer, wherein the proportion of the unit derived from the ionic-group-containing ethylenically unsaturated monomer in the second resin is 3% by mass or more to 70% by mass or less.

21 Claims, 2 Drawing Sheets

(51) Int. Cl.
*B41J 2/175* (2006.01)
*C09D 133/10* (2006.01)
*C09D 11/10* (2014.01)
*C09D 11/106* (2014.01)

(56) References Cited

U.S. PATENT DOCUMENTS

| | | |
|---|---|---|
| 8,845,085 B2 | 9/2014 | Kobayashi et al. |
| 8,939,570 B2 | 1/2015 | Mori et al. |
| 2011/0001775 A1* | 1/2011 | Nishiwaki .............. C09D 11/40 347/9 |
| 2012/0050386 A1 | 3/2012 | Shimizu et al. |
| 2014/0024763 A1 | 1/2014 | Jinnou et al. |
| 2015/0191615 A1 | 7/2015 | Hayashi et al. |
| 2015/0275008 A1 | 10/2015 | Shimomura et al. |

FOREIGN PATENT DOCUMENTS

| | | |
|---|---|---|
| JP | 2011-012172 A | 1/2011 |
| JP | 2012-201692 A | 10/2012 |
| JP | 2013-204025 A | 10/2013 |
| JP | 2014-101492 A | 6/2014 |
| JP | 2015-034268 A | 2/2015 |
| KR | 10-1392328 B1 | 5/2014 |
| WO | 2014/064899 A1 | 5/2014 |

* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

With recent improvement in image quality or recording speed, ink jet recording apparatuses have been used more frequently in the commercial printing field and office printing field. Inks used in such fields are required to have, as their performance, ability of recording images with good fixability and abrasion resistance. In order to improve such performance, an ink containing a resin particle with a core-shell structure is under investigation (refer to Japanese Patent Application Laid-Open No. 2008-179778, Japanese Patent Application Laid-Open No. 2014-101492, Japanese Patent Application Laid-Open No. 2012-201692, and Japanese Patent Application Laid-Open No. 2015-034268).

Since the application field of ink jet recording apparatuses is expanding into the commercial printing field and office printing field, inks are required to have higher levels of fixability and abrasion resistance. As a result of investigation by the present inventors, it has been found that none of the inks described in Japanese Patent Application Laid-Open No. 2008-179778, Japanese Patent Application Laid-Open No. 2014-101492, Japanese Patent Application Laid-Open No. 2012-201692, and Japanese Patent Application Laid-Open No. 2015-034268 have succeeded in satisfying recently required levels of fixability and abrasion resistance.

SUMMARY OF THE INVENTION

An object of the invention is to provide an aqueous ink capable of recording images excellent in fixability and abrasion resistance. Another object of the invention is to provide an ink cartridge and an ink jet recording method, each using the ink.

The above-described objects are achieved by the invention described below. An aqueous ink of the invention is an aqueous ink for ink jet containing a resin particle; the resin particle has a first layer and a second layer in this order from the inside to the outside thereof; the first layer is composed of a first resin having 10% by mass or less of a unit derived from an aromatic-group-containing ethylenically unsaturated monomer; the second layer has a tetrahydrofuran-insoluble fraction of 10% by mass or less and is composed of a second resin having a unit derived from an aromatic-group-containing ethylenically unsaturated monomer and a unit derived from an ionic-group-containing ethylenically unsaturated monomer; and the second resin has 3% by mass or more to 70% by mass or less of the unit derived from an ionic-group-containing ethylenically unsaturated monomer.

The ink cartridge of the invention includes an ink and an ink storage portion for storing the ink therein, wherein the ink is the above-described aqueous ink of the invention.

The ink jet recording method of the invention includes ejecting an ink from an ink jet recording head to record an image on a recording medium, wherein the ink is the above-described aqueous ink of the invention.

According to the invention, an aqueous ink capable of recording images excellent in fixability and abrasion resistance can be provided. In addition, according to the invention, an ink cartridge and an ink jet recording method, each using the aqueous ink, can be provided.

Further features of the present invention will become apparent from the following description of exemplary embodiments with reference to the attached drawings.

DESCRIPTION OF THE EMBODIMENTS

Figure 1:
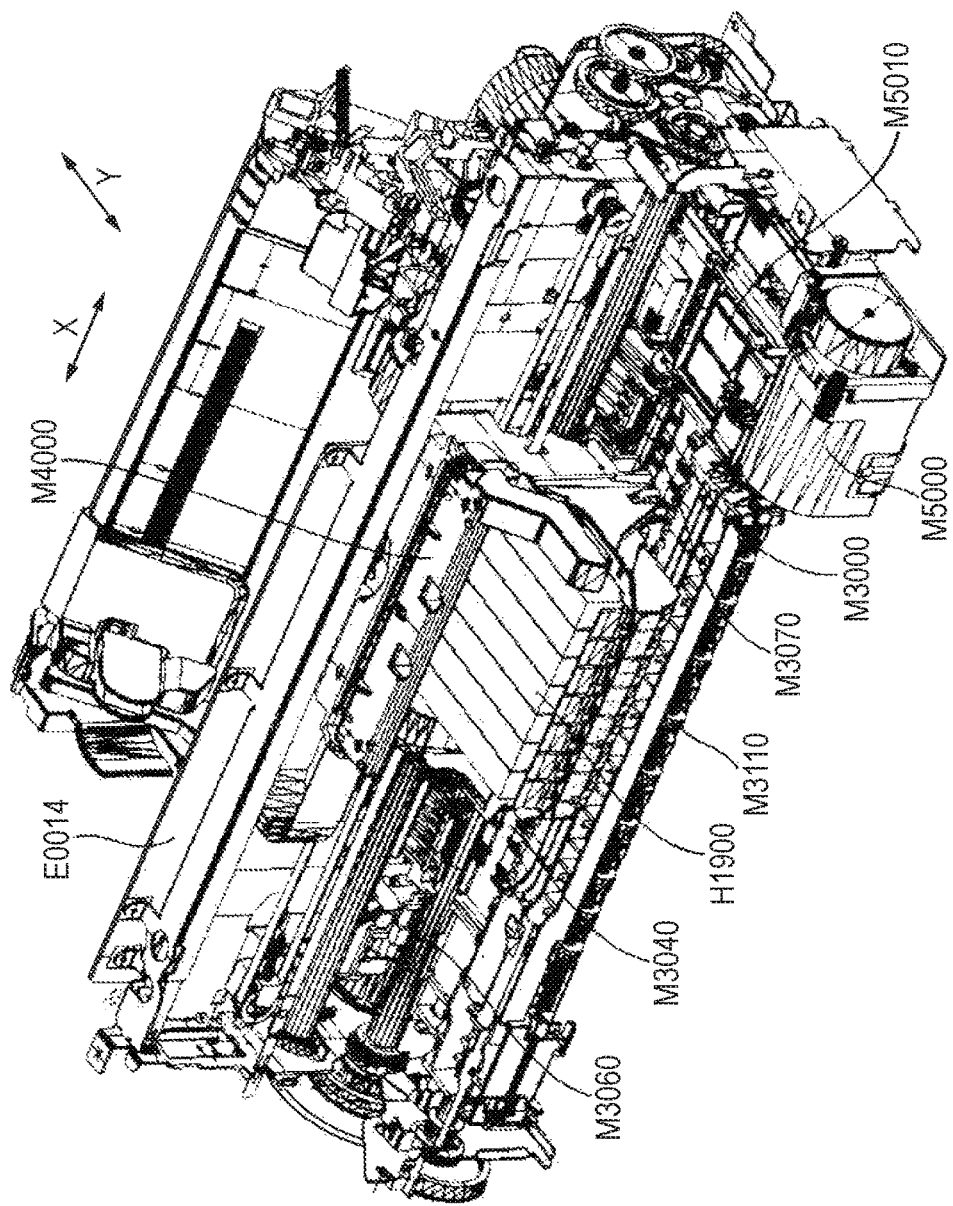
FIG. 1 is a perspective view illustrating a mechanical section of an example of an ink jet recording apparatus.

Preferred embodiments of the present invention will now be described in detail in accordance with the accompanying drawings.

An embodiment of the invention will next be described, but the invention is not limited by the following embodiment. A salt form ionic group may be present as a dissociated ion in an ink but for the convenience sake, it is expressed as "ionic group" in the invention. An aqueous ink for ink jet may be sometimes referred to as "ink" simply. Further, tetrahydrofuran may be abbreviated as "THF". Values of various physical properties as described herein are values at normal temperature (25° C.) unless otherwise particularly specified.

The present inventors have considered the reason why none of the resin particles described in Japanese Patent Application Laid-Open No. 2008-179778, Japanese Patent Application Laid-Open No. 2014-101492, Japanese Patent Application Laid-Open No. 2012-201692, and Japanese Patent Application Laid-Open No. 2015-034268 incorporated in an ink can contribute to recording of an image with excellent fixability and abrasion resistance. In the resin particle described in Japanese Patent Application Laid-Open No. 2008-179778, the proportion of a unit derived from an aromatic-group-containing ethylenically unsaturated monomer is large not only in a resin constituting a shell layer but also in a resin constituting a core layer. This inevitably causes interaction due to π-π stacking between the aromatic group of the core and the aromatic group of the shell. Then, on a recording medium, the resin constituting the shell layer does not spread smoothly, which decreases entanglement of the resin constituting the shell layer between resin particles adjacent to each other. This results in deterioration in aggregation rate and aggregation power of the resin particle, which may be the cause of insufficient fixability and abrasion resistance.

In the resin particle described in Japanese Patent Application Laid-Open No. 2014-101492, a resin constituting a shell layer does not have a unit derived from an aromatic-group-containing ethylenically unsaturated monomer. In the resin particle described in Japanese Patent Application Laid-Open No. 2012-201692, a resin constituting a shell layer has a small proportion of a unit derived from an ionic-group-containing ethylenically unsaturated monomer. Neither interaction due to π-π stacking of an aromatic group nor interaction due to hydrogen bonding or ion bonding of the ionic group occurs so that a driving force for causing entanglement between resins constituting the shell layer is insufficient. In the resin particles adjacent to each other, therefore, the time necessary for causing entanglement between resins constituting the shell layer increases and entanglement frequency decreases, which is presumed to cause insufficient fixability and abrasion resistance.

In the resin particle described in Japanese Patent Application Laid-Open No. 2015-034268, a shell has a THF-insoluble fraction of less than 10% by mass and interaction between resins constituting the shell layer is small. The resin constituting the shell layer therefore has a high degree of freedom so that between resin particles adjacent to each other, the time necessary for causing entanglement of resins constituting the shell layer increases and their entanglement frequency decreases. This is presumed to result in insufficient fixability and abrasion resistance.

Based on the above consideration, the present inventors investigated the constitution of a resin particle having a core-shell structure. As a result, it has been found that in resin particles adjacent to each other, acceleration of entanglement between resins constituting the shell layer and formation of a stable resin film are important for achieving high levels of fixability and abrasion resistance on a recording medium to which an ink has been applied. The present inventors have found a constitution capable of achieving such performance. This constitution will next be described in detail.

The ink of the invention contains a resin particle. This resin particle has a first layer composed of a first resin and a second layer composed of a second resin in this order from the inside to the outside thereof and satisfies the following conditions (1) to (3):
(1) The second resin has a unit derived from an aromatic-group-containing ethylenically unsaturated monomer and a unit derived from an ionic-group-containing ethylenically unsaturated monomer, wherein the proportion of the unit derived from an ionic-group-containing ethylenically unsaturated monomer is 3% by mass or more to 70% by mass or less.
(2) The second layer has a tetrahydrofuran-insoluble fraction of 10% by mass or more.
(3) The proportion of the unit derived from an aromatic-group-containing ethylenically unsaturated monomer in the first resin is 10% by mass or less.

First, the condition (1) will be described. When on a recording medium to which an ink containing a resin particle has been applied, entanglement of the second resin occurs between two resin particles adjacent to each other, its driving force usually comes from an intermolecular force. Since the second resin has an aromatic group, the driving force for entanglement increases due to the π-π stacking. The driving force for entanglement increases further due to hydrogen bonding or ion bonding caused by the ionic group of the second resin. An effect for increasing the driving force for entanglement appears significantly because the proportion of the unit derived from the ionic-group-containing ethylenically unsaturated monomer is 3% by mass or more. The proportion of the unit is 70% by mass or less so that the second resin does not have so high hydrophilicity. Accordingly, water release from the resin particle after application of the ink to the recording medium proceeds rapidly, and the entanglement rate of the second resin increases.

Next, the condition (2) will be described. The THF-insoluble fraction is an index of the solubility of a resin in tetrahydrofuran which is a solvent in which a resin is soluble. When this fraction is smaller, the degree of steric freedom of the resin constituting the resin particle tends to be higher. When the THF-insoluble fraction of a certain resin is as low as less than 10% by mass, the interaction between resins may be small. In this case, the molecular motion of the resin is relatively free. Entanglement among freely-moving resins is kinetically slow because they should take a specific steric conformation.

The change in Gibbs free energy (ΔG) at this time is represented by the following equation:

$$\Delta G = \Delta H - T\Delta S$$

wherein ΔH represents a change in enthalpy, T represents a temperature, and ΔS represents a change in entropy. It is apparent from this equation that when the value ΔS is negatively larger, the value ΔG becomes larger in the positive direction. In other words, when ΔH is a fixed value, entanglement does not proceed smoothly from the standpoint of equilibrium when a decrease in the degree of freedom is large. If there is no large difference in the final entanglement state, the amount of resins to become entangled differs depending on a difference in the degree of freedom in the initial state.

The chemical bonding force or physical interaction in the second resin may be strong when the second layer has a THF-insoluble fraction as high as 10% by mass or more. Specific examples of such bonding or interaction includes covalent bonding between resins formed by a crosslinkable monomer, hydrogen bonding between functional groups having an atom with high electronegativity, π-π stacking between aromatic groups, and intermolecular force. When the bonding force or interaction in the second resin is strong, the degree of freedom relatively decreases, facilitating progress of entanglement from the standpoint of kinetics and equilibrium. Therefore, in the condition of taking a chain form due to small interaction among plural resin chains which constitute the second resin, that fusion between resin particles adjacent to each other which is caused after the ink is applied to a recording medium takes place between the linear resin chains, resulting in poor efficiency of the entanglement. By contrast, in the condition of taking a planner structure due to large interaction among plural resin chains which constitute the second resin, that fusion between resin particles adjacent to each other which is caused after the ink is applied to a recording medium takes place between the planes formed of the resin chains, so that the entanglement proceeds rapidly at high efficiency. As a result of investigation by the present inventors, the chemical bonding force or physical interaction becomes strong if the second layer has a THF-insoluble fraction of 10% by mass or more.

Lastly, the condition (3) will be described. When the first layer has an aromatic group, π-π stacking occurs at the interface between the first layer and the second layer to suppress expansion of the second layer. Entanglement of the resin therefore decreases on the recording medium. Although the π-π stacking is a reversible interaction, the aromatic group of the first layer and the aromatic group of the second layer interact at a predetermined proportion from the standpoint of equilibrium. This means that in order to allow the fusion between adjacent resin particles to proceed rapidly, interaction that occurs between the first layer and the second layer should be suppressed as much as possible. The proportion of the aromatic group in the first resin should therefore be reduced. As a result of investigation by the present inventors, the suppression of expansion of the second layer can be reduced when the proportion of the unit derived from an aromatic-group-containing ethylenically unsaturated monomer in the first resin is 10% by mass or less.

As described above, the advantage of the invention can be achieved by satisfying the constitutions (1) to (3) simultaneously. Constituent components of the invention will next be described using specific examples.

Aqueous Ink

The ink of the invention is an aqueous ink for ink jet containing a resin particle. Components usable for the ink of the invention will next be described. The terms "(meth)acrylic acid", "(meth)acrylate", and "(meth)acryloyl" as described herein mean "acrylic acid or methacrylic acid", "acrylate or methacrylate", and "acryloyl or methacryloyl", respectively.

Resin Particle

The term "resin particle" as used herein means a resin that can be dispersed in an aqueous medium to be present in the aqueous medium while having a particle diameter. This means that the resin particle is present in dispersed form in an ink, in other words, in resin emulsion form. The content (% by mass) of the resin particle in an ink is preferably 1% by mass or more to 30% by mass or less, more preferably 3% by mass or more to 20% by mass or less, each based on the total mass of the ink.

It is possible to determine by the following method whether a certain resin is "resin particle" or not. First, a resin-containing liquid (resin solid content: 10% by mass) neutralized with an alkali (such as sodium hydroxide or potassium hydroxide) equivalent to an acid value is prepared. Then, the liquid thus prepared is diluted to 10 times (based on volume) with pure water to prepare a sample solution. When the particle diameter of the resin in the sample solution is measured by dynamic light scattering method to find a particle having a particle diameter, the resin is determined to be "resin particle". The measurement can be performed, for example, under the following conditions: Set-Zero: 30 seconds, number of measurement: 3 times, measurement time: 180 seconds, shape: sphere, and refractive index: 1.59. As a particle size distribution measuring device, particle size analyzer (for example, trade name; "UPA-EX150", product of Nikkiso Co.) can be used. It is needless to say that the particle size distribution measuring device or measurement conditions are not limited to those described above.

The resin particle has preferably a volume average particle diameter (D50) of 25 nm or more to 600 nm or less, more preferably 50 nm or more to 300 nm or less. The resin particle satisfying the constitution of the invention can produce the advantage of the invention even when it has a relatively small particle diameter D50 such as 50 nm or more to 100 nm or less. The volume-average particle diameter of the resin particle can be measured under conditions similar to those used for the above-described method of determining whether a certain resin is a resin particle or not. The resin particle has preferably a weight average molecular weight (Mw), in terms of polystyrene, of 3,000 or more to 1,000,000 or less obtained by gel permeation chromatography (GPC).

The THF-insoluble fraction of the resin particle as a whole is preferably 80% by mass or less. The THF-insoluble fraction greater than 80% by mass may make it difficult to cause fusion between resin particles adjacent to each other. It may therefore become impossible to produce an effect for improving abrasion resistance. The THF-insoluble fraction of the resin particle as a whole is preferably 5% by mass or more.

The THF-insoluble fraction of the resin particle can be calculated by the following method. The THF-insoluble fraction of each layer of the resin particle can also be calculated by this method. First, a liquid containing a resin to be measured is dried and a resin in solid form is obtained. The resin is added to THF so as to give a resin content of 0.5% by mass, followed by stirring for 24 hours at 25° C. Then, the undissolved resin is weighed to calculate the THF-insoluble fraction (% by mass) based on the following formula: [(mass of undissolved resin)/(mass of added resin)]×100. Presence of an alkali component to be used for neutralizing an ionic group or the like sometimes hinders accurate measurement of the THF-insoluble fraction of a resin. When a sample to be measured contains an alkali component, it is therefore preferred to use a sample from which the alkali component has been removed in advance. During preparation of an aqueous dispersion liquid containing a resin particle, the THF-insoluble fraction of the resin may be measured prior to addition of the alkali component.

The surface charge amount of the resin particle, which is an index of the density of an ionic group of the resin particle, is preferably 1 μmol/m² or more to 500 μmol/m² or less, more preferably 1 μmol/m² or more to 500 μmol/m². The surface charge amount of a resin particle is measured by the following method. First, after a resin particle is collected from an ink or the like by a proper method, water is added to the resin particle. The resulting liquid is adjusted to pH 2 with a mineral acid such as hydrochloric acid, followed by stirring for 24 hours. Then, the reaction mixture is centrifuged. The resin thus precipitated is collected and dried. The resulting resin in solid form is ground, and then a 1 g resin portion is collected from it. To this collected resin, 30 g of a 0.1 mol/L aqueous sodium hydrogen carbonate solution is added. The resulting mixture is stirred for 15 hours to obtain a resin-containing liquid. From this liquid, a 1 g liquid portion is collected and diluted to 15 g with pure water to obtain a diluted liquid. The resin particle in this diluted solution is subjected to colloid titration making use of a potential difference to obtain the charge amount of the resin particle per unit mass. The charge amount thus obtained is divided by the surface area per unit mass calculated from the volume-average particle diameter measured by the above-described method to obtain the surface charge amount. The titration can be performed using a titration apparatus such as an automatic potentiometric titrator ("AT510", trade name; product of Kyoto Electronics Manufacturing Co.) equipped with a streaming potential titration unit (PCD-500) by using a titration reagent such as 0.1 mol/L hydrochloric acid. It is needless to say that the titration apparatus, measurement conditions, or the like are not limited to the above-described ones.

The glass transition temperature of the resin particle is preferably 0° C. or more to 200° C. or less. The glass transition temperature is found by the following method by using a differential scanning calorimeter (DSC). First, a resin particle obtained from an ink or the like by a proper method is dried at 60° C. A 2 mg resin portion is collected from the resin particle and hermetically sealed in an aluminum container. Then, thermal analysis is performed using a differential scanning calorimeter according to the following temperature program. First, the temperature is increased to 200° C. at a rate of 10° C./min and then, it is decreased from 200° C. to −50° C. at a rate of 5° C./min. Then, thermal analysis is performed to measure the glass transition temperature while increasing the temperature from −50° C. to 200° C. at a rate of 10° C./min. For the measurement, an apparatus such as a differential scanning calorimeter ("DSC Q1000", trade name; product of TA Instruments Co.) can be used. It is needless to say that the measurement apparatus and temperature program used for measurement are not limited to the above-described ones.

When the ink jet recording method using the ink of the invention has a heating step for fixing an image, it is preferred to set the heating temperature at a temperature equal to or higher than the glass transition temperature of the resin particle in order to promote fusion between resin particles adjacent to each other. More specifically, the heating temperature is set preferably within a range of 25° C. or more to 200° C. or less.

The resin particle has a first layer composed of a first resin and a second layer composed of a second resin in this order from the inside to the outside thereof. For example, the resin particle has a core particle as the first layer, and the second layer surrounds the core particle. In this case, there may be another layer between the first layer and the second layer insofar as the advantage of the invention is not impaired. There may be another layer outside the second layer. The resin particle may have a core particle and may have the first layer and the second layer in this order so as to cover this core particle. In this case, another layer may be present between the core particle and the first layer or between the first layer and the second layer insofar as the advantage of the invention is not impaired. There may be another layer outside the second layer.

The resin layer has preferably a third layer composed of a unit derived from a reactive surfactant bonded to the second layer. The third layer is present preferably outside the second layer and is in contact with the second layer. In particular, the resin particle is preferably a three-layer resin particle having the first layer, the second layer, and the third layer in this order from the inside to the outside thereof. These layers will next be described, respectively.

First Layer

The first layer of the resin particle is composed of a first resin of which the proportion of a unit derived from an aromatic-group-containing ethylenically unsaturated monomer is 10% by mass or less. Using such a first resin contributes to suppression of the π-π stacking between the first resin and the second resin having a unit derived from an aromatic-group-containing ethylenically unsaturated monomer. On a recording medium to which an ink containing a resin particle has been applied, the second resin spreads well and entanglement occurs between resin particles adjacent to each other. The resulting ink can therefore have fixability and abrasion resistance. In order to suppress the π-π stacking further and obtain an ink having excellent fixability and abrasion resistance, the proportion is preferably 5% by mass or less, more preferably 3% by mass or less, particularly preferably 1% by mass or less. Above all, the proportion is particularly preferably 0% by mass, meaning that the first resin does not have a unit derived from an aromatic-group-containing ethylenically unsaturated monomer. Specific examples of the aromatic-group-containing ethylenically unsaturated monomer will be described later in the description on the second layer.

The THF-insoluble fraction of the first layer is preferably 10% by mass or less, more preferably 5% by mass or less, particularly preferably 3% by mass or less. The THF-insoluble fraction of the first layer may be 0% by mass. The lower the THF-insoluble fraction of the first layer, the weaker the interaction between the first resins. When an ink containing a resin particle is applied to a recording medium, the resin constituting the first layer flows outside the second layer and fusion between resin particles adjacent to each other occurs, so that a stable resin film is formed and a superior level of abrasion resistance can be achieved. The THF-insoluble fraction of the first resin can be determined by calculating the fraction of only the first layer separated from the resin particle by the above-described method or by calculating the fraction of the resin to be used as the first layer by the above-described method. In order to adjust the THF-insoluble fraction of the first layer to 10% by mass or less, it is preferred to properly control, in the first resin, the proportion of a unit derived from a monomer capable of forming a covalent bond or hydrogen bond between resins.

Examples of the monomer capable of forming a covalent bond between resins include crosslinkable monomers. The crosslinkable monomer has, in the molecule thereof, two or more polymerizable functional groups capable of causing a polymerization reaction, such as ethylenically unsaturated bond. As described above, when an ink containing a resin particle is applied to a recording medium, the resin constituting the first layer flows outside the second layer and fusion occurs between resin particles adjacent to each other to form a resin film. For further improvement of abrasion resistance, it is important for the resin film thus formed to be not excessively rigid and have a certain level of flexibility. The covalent bond is however very stable and excessively reinforces entanglement between resins. The resin film thus formed is likely to be fragile because of excessive rigidity and inevitably has slightly deteriorated abrasion resistance. For achieving a superior level of abrasion resistance, the proportion of a unit derived from a crosslinkable monomer in the first resin is preferably 1% by mass or less, more preferably 0.5% by mass or less. Above all, the proportion is particularly preferably 0% by mass, meaning that the first resin does not have the unit derived from a crosslinkable monomer. The specific examples of the crosslinkable monomer will be described later in the description on the second layer.

Examples of the monomer capable of forming a hydrogen bond between different resins include monomers having at least one functional group selected from the group consisting of a carboxy group, an alcoholic hydroxy group, and a silanolic hydroxy group. The term "alcoholic hydroxy group" means a C(OH) group, that is, a hydroxy group having a non-aromatic carbon atom bonded thereto, while a silanolic hydroxy group means an Si(OH) group, that is, a hydroxy group having a silicon atom bonded thereto. As described above, when an ink containing a resin particle is applied to a recording medium, the resin constituting the first layer flows outside the second layer and fusion occurs between the resin particles adjacent to each other to form a resin film. For further improvement of abrasion resistance, it is important for the resin film thus formed to be not excessively rigid and have a certain level of flexibility. The above-described functional groups however each have a hydrogen atom and an oxygen atom capable of forming a hydrogen bond so that two complementary hydrogen bonds are formed between a pair of functional groups or many hydrogen bonds are formed between resins to inevitably make the entanglement between first resins excessively strong. The resin film thus formed is therefore likely to become excessively rigid and fragile, and the ink thus obtained slightly reduces abrasion resistance. For achieving a superior level of abrasion resistance, the proportion of the unit derived from a monomer having the above-described functional group in the first resin is preferably 5% by mass or less, more preferably 1% by mass or less. Above all, the proportion is particularly preferably 0% by mass, meaning that the first resin does not have such a unit.

Specific examples of the carboxy-group-containing monomer include (meth)acrylic acid and p-vinylbenzoic acid. Specific examples of the alcoholic-hydroxy-containing monomer include 2-hydroxyethyl (meth)acrylate and 2,3-dihydroxypropyl (meth)acrylate. Specific examples of the silanolic-hydroxy-containing monomer include vinylsilanetriol.

In order to adjust the THF-insoluble fraction of the first layer to 10% by mass or less, using a non-crosslinkable monomer at the time of polymerizing the first resin is preferred. This means that the first resin preferably has a unit derived from a non-crosslinkable monomer. The non-crosslinkable monomer is a monomer having, in the molecule thereof, only one polymerizable functional group capable of causing a polymerization reaction such as ethylenically unsaturated bond. Specific examples include alkenes such as ethylene and propylene, carboxy-group-containing monomers such as (meth)acrylic acid, alkyl (meth)acrylate such as methyl (meth)acrylate, butyl (meth)acrylate, lauryl (meth) acrylate, and hexadecyl (meth)acrylate, and aromatic-group-containing monomers such as styrene and allylbenzene. These monomers may be used either singly or in combination of two or more thereof. Of these, alkenes having 1 or more to 22 or less carbon atoms, (meth)acrylic acid, alkyl (meth)acrylates whose alkyl group has 1 or more to 22 or less carbon atoms, and styrene are preferred. Using alkyl (meth)acrylates whose alkyl group has one or more to 12 or less carbon atoms is particularly preferred because they facilitate adjustment of thermophysical properties such as glass transition temperature of the resin particle and the film thus formed has excellent properties.

The proportion of the unit derived from a non-crosslinkable monomer in the first resin is preferably 80% by mass or more, more preferably 90% by mass or more, particularly preferably 95% by mass or more. Above all, the proportion is particularly preferably 100% by mass, meaning that the first resin has only the unit derived from a non-crosslinkable monomer. In addition, as described above, the first resin preferably has neither the unit derived from an aromatic-group-containing ethylenically unsaturated monomer nor the unit derived from a particular monomer that forms a hydrogen bond. The first resin is therefore the unit derived from a non-crosslinkable monomer. It is most preferred that the first resin is composed only of a unit derived from an alkyl (meth)acrylate whose alkyl group has 1 or more to 12 or less carbon atoms.

The first layer is composed of the first resin but it may contain a resin different from the first resin insofar as the advantage of the invention is not impaired. The proportion (% by mass) of the first resin in the first layer is, based on the total mass of the first layer, preferably 90% by mass or more, more preferably 95% by mass or more, particularly preferably 100% by mass, meaning that the first layer is composed only of the first resin.

The proportion (% by mass) of the first layer in the resin particle is preferably 30% by mass or more to 90% by mass or less based on the total mass of the resin particle. When the first layer is not a core particle, the first layer covers the core particle or at least a portion of a layer inside the first layer, but coverage is not limited to 100%. More specifically, coverage of the core particle or the layer inside the first layer with the first layer is preferably 20% or more, more preferably 50% or more, particularly preferably 70% or more, each based on surface area.

Second Layer

The second layer of the resin particle is required to satisfy the following conditions: (1) it has a THF-insoluble fraction of 10% by mass or more. (2) The second layer is composed of a second resin having a unit derived from an aromatic-group-containing ethylenically unsaturated monomer and a unit derived from an ionic-group-containing ethylenically unsaturated monomer. (3) The proportion of the unit derived from an ionic-group-containing ethylenically unsaturated monomer in the second resin is 3% by mass or more to 70% by mass or less. As described above, by satisfying the above-described conditions, the second resin spreads smoothly on a recording medium to which an ink containing a resin particle has been applied, and then entanglement between resin particles adjacent to each other occurs rapidly and firmly. As a result, the resulting ink can have fixability and abrasion resistance.

For efficient entanglement between resins, the degree of steric freedom in the second resin is preferably higher than that in the first resin. The THF-insoluble fraction of the second layer is therefore higher than the THF-insoluble fraction of the first layer, that is, it is more than 10% by mass. It is more preferably 15% by mass or more to 80% by mass or less, still more preferably 20% by mass or more to 75% by mass or less, particularly preferably 30% by mass or more to 70% by mass or less. The THF-insoluble fraction of the second layer is preferably 95% by mass or less. A difference in the THF-insoluble fraction between the second layer and the first layer is preferably 5% by mass or more, more preferably 10% by mass or more, particularly preferably 20% by mass or more. The difference in THF-insoluble fraction between the second layer and the first layer is, on the other hand, preferably 60% by mass or less.

Using a crosslinkable monomer at the time of polymerizing the second resin is preferred to adjust the THF-insoluble fraction of the second layer to 10% by mass or more. This means that the second resin has preferably a unit derived from a crosslinkable monomer. In addition, the proportion of the unit derived from a crosslinkable monomer in the second resin is preferably 3% by mass or more to 50% by mass or less, more preferably 10% by mass or more to 40% by mass or less, particularly preferably 15% by mass or more to 30% by mass or less. Above all, it is preferably 15% by mass or more to 25% by mass or less. When the proportion is 3% by mass or more, the advantage due to this unit can be produced fully and a superior level of fixability and abrasion resistance can be achieved. When the proportion is 50% by mass or less, on the other hand, the degree of steric freedom of the second resin does not decrease excessively and entanglement of the resin particle occurs sufficiently, so that the resulting ink can have a superior level of fixability and abrasion resistance.

The crosslinkable monomer has, in the molecule thereof, two or more polymerizable functional groups such as ethylenically unsaturated bond as described above. Specific examples include dienes such as butadiene and isoprene; bifunctional (meth)acrylates such as 1,4-butanediol di(meth)acrylate, 1,9-nonanediol di(meth)acrylate, (mono-, di-, tri-, or poly-)ethylene glycol di(meth)acrylate, (mono-, di-, tri-, or poly-) polypropylene glycol di(meth)acrylate, (mono-, di-, tri-, or poly-)tetramethylene glycol di(meth)acrylate, ethylene-oxide-modified bisphenol A di(meth)acrylate, 2-hydroxy-3-(meth) acryloyloxypropyl methacrylate, propoxylated ethoxylated bisphenol A di(meth)acrylate, ethoxylated bisphenol A di(meth)acrylate, 9,9-bis(4-(2-(meth)acryloyloxyethoxy)phenyl)fluorene, tricyclodecanedimethanol di(meth)acrylate, 1,10-decanediol di(meth)acrylate, 1,6-hexanediol di(meth)acrylate, neopentyl glycol di(meth)acrylate, triethylene glycol di(meth)acrylate, tricyclodecanedimethanol di(meth)acrylate, ethoxylated polypropylene glycol di(meth)acrylate, and glycerin di(meth)acrylate; trifunctional (meth)acrylates such as tris(2-(meth)acryloyloxyethyl)isocyanurate, trimethylolpropane tri(meth)acrylate, tris(2-hydroxyethyl)isocyanurate tri(meth)acrylate, ethoxylated trimethylolpropane tri(meth)acrylate, pentaerythritol tri(meth)acrylate, propoxylated trimethylolpropane tri(meth)acrylate, propoxylated glyceryl tri(meth)acrylate, ethoxylated isocyanuric acid tri(meth)acrylate, ε-caprolactone-modified tris(2-(metha)acryloxyethyl)isocyanurate, and ethylene-oxide-modified trimethylolpropane tri(meth)acrylate; tetrafunctional (meth)acrylates such as ditrimethylolpropane tetra(meth)acrylate, ethoxylated pentaerythritol tetra(meth)acrylate, and pentaerythritol tetra(m- eth)acrylate; and divinylbenzene. These monomers can be used either singly or in combination of two or more thereof.

Of these, crosslinkable monomers having two ethylenically unsaturated bonds are preferred, because using them suppresses aggregation which may otherwise occur by excessive bridging of a plurality of resin particles during polymerization and thereby provides resin particles having a uniform particle diameter. Such resin particles form a uniform resin film so that a superior level of fixability and abrasion resistance can be achieved. Preferred example of the crosslinkable monomers having two ethylenically unsaturated bonds include 1,4-butanediol di(meth)acrylate, (mono-, di-, tri- or poly-)ethylene glycol di(meth)acrylate. In particular, 1,4-butanediol dimethacrylate and ethylene glycol dimethacrylate are preferred.

The second resin has a unit derived from an aromatic-group-containing ethylenically unsaturated monomer. The proportion of the unit derived from an aromatic-group-containing ethylenically unsaturated monomer in the second resin is preferably 20% by mass or more to 90% by mass or less, more preferably 20% by mass or more to 80% by mass or less. Above all, the proportion is preferably 20% by mass or more to 60% by mass or less, more preferably 22% by mass or more to 55% by mass or less, particularly preferably 25% by mass or more to 50% by mass or less. When the proportion is 20% by mass or more, the advantage due to this unit is fully produced, and accordingly a superior level of fixability and abrasion resistance can be achieved. When the proportion is 90% by mass or less, on the other hand, $\pi$-$\pi$ stacking in the second layer does not become too strong, the second resin spreads well, and sufficient entanglement occurs between the resin particles adjacent to each other. As a result, a superior level of fixability and abrasion resistance can be achieved.

Examples of the aromatic group in the aromatic-group-containing ethylenically unsaturated monomer include aromatic hydrocarbon groups and aromatic heterocyclic groups. Examples of the cyclic structure include monocycles, fused polycycles, and biaryls having a plurality of aromatic groups linked to each other. It may have, in addition to a substituent containing an ethylenically unsaturated bond, a substituent, for example, a halogen atom such as fluorine atom, chlorine atom, and bromine atom, an alkyl group such as methyl group, ethyl group, normal propyl group, isopropyl group, normal butyl group, tertiary butyl group, and octyl group, a nitro group, an amino group, a hydroxy group, a sulfo group, and a carboxy group. The alkyl group as the substituent may be substituted further with a halogen atom. Specific examples of the aromatic-group-containing ethylenically unsaturated monomer include styrene, p-fluorostyrene, p-chlorostyrene, α-methylstyrene, o-methylstyrene, m-methylstyrene, p-methylstyrene, 2-vinylnaphthalene, 9-vinylanthracene, 9-vinylcarbozole, p-divinylbenzene, phenyl (meth)acrylate, benzyl (meth)acrylate, 2-phenoxyethyl (meth)acrylate, 2,4-diamino-6-((meth)acryloyloxy) ethyl-1,3,5-triazine, 2-naphthyl (meth)acrylate, 9-anthryl (meth)acrylate, and (1-pyrenyl)methyl (meth)acrylate, and 1,4-phenylene di(meth)acrylate. These monomers may be used either singly or in combination of two or more thereof. Of these, styrene, α-methylstyrene, benzyl (meth)acrylate, and 2-phenoxyethyl (meth)acrylate are preferred because they have good reactivity during polymerization and provide the resulting resin particle with excellent stability.

The second resin has a unit derived from an ionic-group-containing ethylenically unsaturated monomer. The proportion of the unit derived from an ionic-group-containing ethylenically unsaturated monomer in the second resin is 3% by mass or more to 70% by mass or less, preferably 5% by mass or more to 60% by mass or less, still more preferably 7% by mass or more to 50% by mass or less.

Examples of the ionic group in the ionic-group-containing ethylenically unsaturated monomer include anionic groups such as carboxy group, phenolic hydroxy group, and phosphoric acid ester group, and cationic groups such as amino group and ammonium group. Of these, a carboxy group is preferred as the ionic group because the resin particle formed thereof has good stability in an ink, and at the same time a superior level of fixability and abrasion resistance can be achieved. Specific examples of the ionic-group-containing ethylenically unsaturated monomer include (meth) acrylic acid, p-vinylbenzoic acid, 4-vinylphenyl, β-carboxyethyl (meth)acrylate, (methacrylic acid-2-hydroxyethyl) phosphate, 2-(dimethylamino)ethyl (meth)acrylate, and 2-(acryloyloxy)ethyltrimethylammonium chloride. These monomers may be used either singly or in combination of two or more thereof. Of these, (meth)acrylic acid is preferred as the ionic-group-containing ethylenically unsaturated monomer.

During polymerization of the second resin, similar to the first resin, a non-crosslinkable monomer can be used. Specific examples of the non-crosslinkable monomer are similar to those used for the first resin. The proportion of a unit derived from the non-crosslinkable monomer is 50% by mass or more to 97% by mass or less, more preferably 60% by mass or more to 90% by mass or less, particularly preferably 70% by mass or more to 85% by mass or less. Above all, the proportion is preferably 75% by mass or more to 85% by mass or less. When the aromatic-group-containing ethylenically unsaturated monomer and the ionic-group-containing ethylenically unsaturated monomer are non-crosslinkable, the proportion of the unit derived from the non-crosslinkable monomer is a proportion including these units.

The second layer is composed of the second resin. The second layer may contain a resin different from the second resin insofar as the advantage of the invention is not impaired by it. The proportion (% by mass) of the second resin in the second layer is, based on the total mass of the second layer, preferably 90% by mass or more, more preferably 95% by mass or more, particularly preferably 100% by mass, meaning that the second layer is composed only of the second resin.

The proportion (% by mass) of the second layer in the resin particle is preferably 2% by mass or more to 70% by mass or less based on the total mass of the resin particle. When the second layer is adjacent to the first layer, the second layer covers at least a portion of the first layer. The coverage is not limited to 100%. More specifically, the second layer covers preferably 20% or more, more preferably 50% or more, particularly preferably 70% or more of the first layer, based on the surface area.

The second layer has preferably a thickness of 1 nm or more to 30 nm or less. In addition, the thickness of the first layer is preferably 5 times or more to 1,000 times or less, more preferably 5 times or more to 60 times or less as much as the thickness of the second layer. When the first layer is a core particle of the resin particle, the particle diameter of the core particle is regarded as the thickness of the first layer. The thickness of each layer can be calculated from a difference in the particle diameter before and after formation of the layer. For example, after measurement of the particle diameter of the resin particle having the first layer, the particle diameter of the resin particle covered with the second layer is measured and then the thickness of the second layer is determined from the difference.

Third Layer

The resin particle further has preferably a third layer composed of a unit derived from a reactive surfactant bonded to the second layer (second resin). The third layer is bonded to the second layer, which means that the third layer forms a chemical bond with the second layer. By providing such a third layer, when the respective second resins of the resin particles adjacent to each other become entangled, a hydrophilic part of the unit derived from a reactive surfactant forms a hydrogen bond with the ionic group of the other one of the resin particles. This intensifies entanglement between the adjacent resin particles so that a superior level of fixability and abrasion resistance can be achieved. On the other hand, the surfactant physically adsorbed to the second layer does not correspond to "reactive surfactant bonded to the second layer" of the invention. For example, when a surfactant is physically adsorbed to a resin particle having a first layer and a second layer in this order, it does not mean that the surfactant is not bonded to the second layer. Since the surfactant not chemically bonded to but physically adsorbed to the second layer is likely to be released, it has no action for intensifying the bonding force between the adjacent resin particles and is not effective for improving the fixability and abrasion resistance further.

Whether or not the reactive surfactant is bonded to the second layer can be determined based on the following methods (i) to (iii). An analysis method of a resin particle extracted from an ink will next be described. This method can also be used for the analysis of a resin particle extracted from an aqueous dispersion liquid.

(i) Extraction of Resin Particle

From the ink containing the resin particle, the resin particle is separated by a density gradient centrifugation method. The resin particle can be separated and extracted based on a difference in sedimentation coefficient in a density gradient sedimentation velocity method or based on a difference in density of components in a density gradient sedimentation equilibrium method.

(ii) Verification of Layer Structure and Separation Thereof

The resin particle is stained with ruthenium tetraoxide, followed by fixing treatment. Then, in order to maintain the resin particle stably, the resin particle is buried in an epoxy resin. Then, the resin particle buried in the epoxy resin is cut using an ultramicrotome and the cross-section is observed using a scanning transmission electron microscope (STEM). The layer structure of the resin particle can be verified from the cross-section cut through the gravity center of the resin particle. Using this sample also enables quantitative analysis of a contained element by STEM-EDX juxtaposed with an energy dispersion X-ray spectroscopy (EDX). After finding of the characteristic of the element contained in each layer, the resin constituting each layer is separated.

(iii) Analysis of Unit (Monomer) Constituting the Resin of Each Layer

The resin particle to be used for separating the resin from each layer may be in dispersion form or in dried film form. The resin particle is dissolved in an organic solvent capable of dissolving it therein. By making use of the solution thus obtained, each layer is separated by gel permeation chromatography and the resin constituting each layer is collected. The resin thus collected is subjected to elemental analysis by the combustion method. Apart from this, after the resin is pretreated by the acid decomposition (hydrofluoric acid addition) method or alkali fusion method, quantitative analysis of inorganic components is performed by inductively coupled plasma emission spectroscopy. Comparison between this analysis result and elemental quantitative analysis by STEM-EDX obtained above in (ii) reveals which layer the resin constitutes.

The resin thus obtained is analyzed by nuclear magnetic resonance (NMR) spectroscopy or matrix-assisted laser desorption/ionization mass spectrometry (MALDI-MS). Such a method reveals the kind or proportion of the constituent unit (monomer) of the resin or the unit derived from a reactive surfactant bonded to the second layer. Further, a monomer generated by depolymerization can be directly detected by analyzing the resin by pyrolysis gas chromatography.

The term "reactive surfactant" means a compound having, in the molecule thereof, a hydrophilic part, a hydrophobic part, and an ethylenically unsaturated bond. The term "hydrophilic part" means such a part as the ionic group and the ethylene oxide structure of the molecule, while the term "hydrophobic part" means a part of the molecule other than the hydrophilic part and ethylenically unsaturated bond part. As a result of the reaction of the ethylenically unsaturated bond, the reactive surfactant chemically bonds to the second resin, is introduced into the resin particle, and constitutes a third layer as the unit derived from a reactive surfactant. The third layer is preferably composed only of the unit derived from a reactive surfactant bonded to the second layer.

The dispersion of the resin particle having the third layer is stabilized by repulsion due to steric hindrance of the reactive surfactant. Further, when the ink containing the resin particle is used in an ink jet system, the ink exhibits improved discharge stability because clogging of an injection orifice of the recording head with the ink or adhesion of the resin particle to around the injection orifice is suppressed. This is because the surfactant contributing to dispersion of the resin particle is bonded to the resin particle and prevents exfoliation during discharging even when a shear force is applied to ink droplets.

As the reactive surfactant, using polyoxyalkylene alkyl ethers having, bonded to the molecule thereof or at the end of the molecule thereof, a (meth)acryloyl group, a maleyl group, a vinyl group, an allyl group, or the like is preferred. Specific examples thereof include polyoxyethylene nonylpropenylphenyl ether ("Aqualon" RN-20, RN-30, RN-50, and the like, trade name; product of Dai-ichi Kogyo Seiyaku Co.); polyoxyethylene nonylpropenylphenyl ether ammonium sulfate ("Aqualon" HS-10, BC-0515, BC-10, BC-20, and the like, trade name; product of Dai-ichi Kogyo Seiyaku); polyoxyethylene-1-(allyloxymethyl)alkyl ether ammonium sulfate ("Aqualon" KH-05, KH-10, and the like, trade name; product of Dai-ichi Kogyo Seiyaku Co.); α-hydro-ω-(1-alkoxymethyl-2-(2-propenyloxy)ethoxy)-poly(oxy-1,2-ethanediyl)) ("Adeka Reasoap" ER-10, ER-20, ER-30, ER-40, and the like, trade name; product of Adeka Co.); α-[1-[(allyloxy)methyl]-2-(nonylphenoxy)ethyl]-ω-hydroxypolyoxyethylene ("Adeka Reasoap" NE-10, NE-20, NE-30, NE-40, NE-50 and the like, trade name; product of Adeka Co.); α-sulfo-ω-(1-alkoxymethyl-2-(2-propenyloxy)ethoxy)-poly(oxy-1,2-ethanediyl)ammonium salt ("Adeka Reasoap" SR-10S, SR-10, SR-20, SR-3025, SE-10N, SE-20N and the like, trade name; product of Adeka Co.); 2-sodium sulfoethyl methacrylate ("Antox MS-2N", trade name; product of Nippon Nyukazai Co.); bis(polyoxyethylene polycyclic phenyl ether)methacrylate sulfate ester salt ("Antox MS-60" and the like, trade name; product of Nippon Nyukazai Co.); alkoxypolyethylene glycol methacrylate ("Antox" LMA-10, LMA-20, LMA-27, and the like; trade name; product of Nippon Nyukazai Co.); alkoxypolyethylene glycol maleate ester ("Antox" SMH-20, LMH-20, EMH-20, and the like, trade name; product of Nippon Nyukazai Co.); polyoxyalkylene alkenyl ether ("Latemul" PD-420, PD-430, PD-450, and the like, trade name; product of Kao Co.); polyoxyalkylene alkenyl ether ammonium sulfate ("Latemul PD-105" and the like, trade name; product of Kao Co.); vinyl ether alkoxylate ("Emulsogen" R208, R307, and the like, trade name; product of Clariant Co.); alkyl allyl sulfosuccinate ("Eleminol JS-20" and the like, trade name; product of Sanyo Chemical Industries Co.); polyoxyalkylene methacrylate sulfate ester salt ("Eleminol RS-3000" and the like, trade name; product of Sanyo Chemical Industries Co.); and unsaturated phosphate ester ("Maxemul" 6106, 6112, and the like, trade name; product of Croda Co.). They may be used either singly or in combination of two or more thereof.

When the resin particle has the third layer, the proportion (% by mass) of the third layer in the resin particle is preferably 1% by mass or more to 20% by mass or less, more preferably 1% by mass or more to 10% by mass or less, each based on the total mass of the resin particle. Above all, it is preferably 1% by mass or more to 5% by mass or less. In addition, it is preferred that the third layer covers only a portion of the second layer and does not cover the entirety of the second layer. More specifically, the third layer covers preferably 50% or less, more preferably 30% or less, particularly preferably 10% or less of the second layer, each based on the surface area.

Preparation Process of Resin Particle

For the preparation of a resin particle, any known method can be used insofar as it satisfies the constitution of the invention described above. Examples thereof include emulsion polymerization, pre-emulsion polymerization, seed polymerization, phase-transfer emulsification.

As a typical example, a preparation process using a non-crosslinkable monomer for the synthesis of the first resin, a non-crosslinkable monomer and a crosslinkable monomer for the synthesis of the second resin, and a reactive surfactant which will be polymerized into the third layer will next be described. The non-crosslinkable monomer to be used for the synthesis of the second resin contains an aromatic-group-containing ethylenically unsaturated monomer and an ionic-group-containing ethylenically unsaturated monomer. In this case, the resin particle is available by the following two steps. First, a first step is performed to perform emulsion polymerization of a non-crosslinkable monomer and thereby obtaining a liquid containing an uncrosslinked first resin. Then, a second step is performed by adding, to the liquid thus obtained in the above step, non-crosslinkable monomers (aromatic-group-containing ethylenically unsaturated monomer and ionic-group-containing ethylenically unsaturated monomer), a crosslinkable monomer, and a reactive surfactant to polymerize the resulting mixture. This means that even polymerization is performed simultaneously in the second step by adding, to a reaction system, the reactive surfactant together with various monomers to be used for the synthesis of the second layer, the reactive surfactant is arranged outside the second layer by the action of its hydrophilic part and forms a third layer. The first and second steps are performed preferably in an aqueous liquid medium.

Coloring Material

The ink of the invention may be a clear ink containing no coloring material, but it may contain a coloring material. Examples of the coloring material include pigments and dyes. Any known one is usable. From the standpoint of water resistance of a recorded image, pigments are preferred. The content (% by mass) of the coloring material in the ink is preferably 0.1% by mass or more to 15.0% by mass or less, more preferably 1.0% by mass or more to 10.0% by mass or less, each based on the total mass of the ink.

When the pigment is used as the coloring material, no particular limitation is imposed on the kind of the pigment. Specific examples of the pigment include inorganic pigments such as carbon black and organic pigments such as azo, phthalocyanine, quinacridone, isoindolinone, imidazolone, diketopyrrolopyrrole, and dioxazine. They may be used either singly or in combination of two or more thereof. When classified by a dispersing method, examples of the pigment include a resin-dispersed type pigment using a resin as a dispersant (resin-dispersed pigment using a resin dispersant, a microcapsule pigment obtained by covering the surface of a pigment particle with a resin, a resin-bonded pigment obtained by chemically bonding a resin to the surface of a pigment particle) and a self-dispersible type pigment (self-dispersible pigment) obtained by bonding a hydrophilic group to the surface of a pigment particle directly or via another atomic group. It is needless to say that a pigment different in dispersing method may be used in combination.

In the resin dispersion type pigment, a resin having a hydrophilic part and a hydrophobic part is preferred as a dispersant. Specific examples include acrylic resins polymerized using a carboxy-group-containing hydrophilic monomer such as (meth)acrylic acid and a hydrophobic monomer such as styrene and alkyl (meth)acrylate, and urethane resins polymerized using an anionic-group-containing diol such as dimethylolpropionic acid and polyisocyanate. The resin used as a dispersant preferably has an acid value of 50 mgKOH/g or more to 300 mgKOH/g or less. The weight average molecular weight (Mw), determined by GPC in terms of polystyrene, of the resin used as a dispersant is preferably 1,000 or more to 15,000 or less. The content (% by mass) of the resin to be used as a dispersant in the ink is preferably 0.1% by mass or more to 10.0% by mass or less, more preferably 0.2% by mass or more to 4.0% by mass or less, each based on the total mass of the ink. The content of the resin to be used as the dispersant is, in terms of mass ratio to the content of the pigment, 0.1 times or more to 1.0 time or less.

In the self-dispersion type pigment, an anionic group such as carboxy group, a sulfonic acid group, or a phosphonic acid group has been bonded to the particle surface of the pigment directly or via another atomic group (—R—). The anionic group may be of either an acid form or a salt form. When it is a salt form, either a portion or entirety of the anionic group may be dissociated. Examples of the cation which will be a counter ion when the anionic group is a salt form include alkali metal cations, ammonium, and organic ammonium. Examples of the alkali metal cation include lithium, sodium, and potassium. Examples of the organic ammonium include cations such as alkylamines having 1 or more to three or less carbon atoms and alkanolamines having 1 or more to 4 or less carbon atoms. Specific examples of said another atomic group (—R—) include linear or branched alkylene groups having 1 to 12 carbon atoms, arylene groups such as phenylene and naphthylene, amide group, sulfonyl group, amino group, carbonyl group, ester group, and ether group. It may also be a group using at least two of the above-described groups in combination.

When a dye is used as the coloring material, it is preferred to use dyes having an anionic group such as sulfonic acid group or carboxy group and thereby having water solubility. Specific examples thereof include acid dyes, direct dyes, and reactive dyes listed in COLOUR INDEX. Even a dye not listed in COLOUR INDEX can be used suitably insofar as it is a dye having an anionic group such as sulfonic acid group or a carboxy group.

Aqueous Medium

The ink of the invention is an aqueous ink containing at least water as an aqueous medium. The ink of the invention may further contain a water soluble organic solvent as the aqueous medium. As water, deionized water or ion exchange water is preferred. The content (% by mass) of water in the ink is 50.0% by mass or more to 95.0% by mass or less, based on the total mass of the ink. The content (% by mass) of the water soluble organic solvent in the ink is preferably 3.0% by mass or more to 50.0% by mass or less based on the total mass of the ink. As the water-soluble organic solvent, any of water-soluble organic solvents typically used for inks can be used. Examples thereof include alcohols, (poly) alkylene glycols, glycol ethers, nitrogen-containing compounds, and sulfur-containing compounds. They may be used either singly or in combination of two or more thereof.

Other Additives

The ink of the invention may contain, in addition to the above-described components, a water soluble organic compound which is in solid form at normal temperature, e.g., a polyol such as trimethylolpropane and trimethylolethane and a urea derivative such as urea and ethylene urea if necessary. The ink of the invention may further contain various additives such as a surfactant, pH regulator, corrosion inhibitor, antiseptic agent, antifungal agent, antioxidant, reduction inhibitor, evaporation accelerator, chelating agent, and resin other than the above-described resin particle, if necessary.

Physical Properties of Ink

When the ink of the invention is used in an ink jet system, its physical property values are preferably controlled appropriately. Specifically, the surface tension of the ink at 25° C. as measured by the plate method is preferably 20 mN/m or more to 60 mN/m or less, more preferably 25 mN/m or more to 45 mN/m or less. The viscosity of the ink at 25° C. is preferably 1.0 mPa·s or more to 10.0 mPa·s or less, more preferably 1.0 mPa·s or more to 5.0 mPa·s or less, particularly preferably 1.0 mPa·s or more to 3.0 mPa·s or less. The pH of the ink at 25° C. is preferably 5.0 or more to 10.0 or less. In particular, when the ink of the invention is an ink containing a coloring material, it is preferred to incorporate a pH regulator or the like in the ink to adjust its pH to preferably 6.0 or more to 10.0 or less.

Ink Cartridge

An ink cartridge of the invention is equipped with an ink and an ink storage portion for storing the ink therein. The ink stored in the ink storage portion is the ink of the invention described above. The ink storage portion may retain the whole amount of the ink to be stored therein by using an absorber. The ink storage portion may store therein the whole amount of the ink in liquid form without having an absorber. The ink cartridge may be comprised of an ink storage portion and a recording head.

Ink Jet Recording Method

An ink jet recording method of the invention is a method of ejecting the above-described ink of the invention from an ink jet recording head to record an image on a recording medium. Examples of the ink ejecting system include a system of applying dynamic energy to an ink and a system of applying thermal energy to an ink. In the invention, using the system of applying thermal energy to an ink to eject the ink is particularly preferred. As for the process of the ink jet recording method, any known process can be used insofar the ink of the invention is used.

The term "recording" as used herein includes a mode of recording on a recording medium with the ink of the invention and a mode of printing on a non-liquid-absorbing substrate such as glass, plastic, or film with the ink of the invention. Examples of the recording medium include paper and coated paper. The coated paper has a porous layer composed of an inorganic pigment and a binder on a gas permeable substrate such as paper.

FIG. 1 is a perspective view illustrating the mechanical section of an example of an ink jet recording apparatus to which the ink of the invention can be applied. When paper is fed, first, in a paper feeding section including a paper feeding tray, a predetermined number of recording media are sent to a nip section comprised of a paper feeding roller and a separation roller. The recording media are separated at the nip section and only the uppermost recording medium is conveyed. The recording medium conveyed to a conveying section is sent to a roller pair comprised of a conveying roller M3060 and a pinch roller M3070, guided by a pinch roller holder M3000 and a paper guide flapper. The roller pair comprised of a conveying roller M3060 and a pinch roller M3070 is rotated, driven by an LF motor, by which the recording medium is conveyed onto a platen M3040.

In recording an image, a carriage section places the recording head at a target image recording position and ejects an ink to the recording medium in accordance with signals from an electric substrate. In the ink jet recording apparatus, an image is formed on the recording medium by alternately performing main-scanning performed by a carriage M4000 in a column direction and sub-scanning performed by the conveying roller M3060 for conveying the recording medium in a row direction, while performing recording with the recording head. Lastly, the recording medium having thereon a recorded image is sandwiched by a nip between a first paper-ejecting roller M3110 and a spur at a paper delivery section and is conveyed and delivered to a paper delivery tray. The recording apparatus described here is a recording apparatus having thereon a so-called serial system recording head, but it may be a recording apparatus having thereon a line type recording head in which ink ejection orifices are arranged over the entire width (maximum paper width) of the recording medium in a conveying direction.

Figure 2:
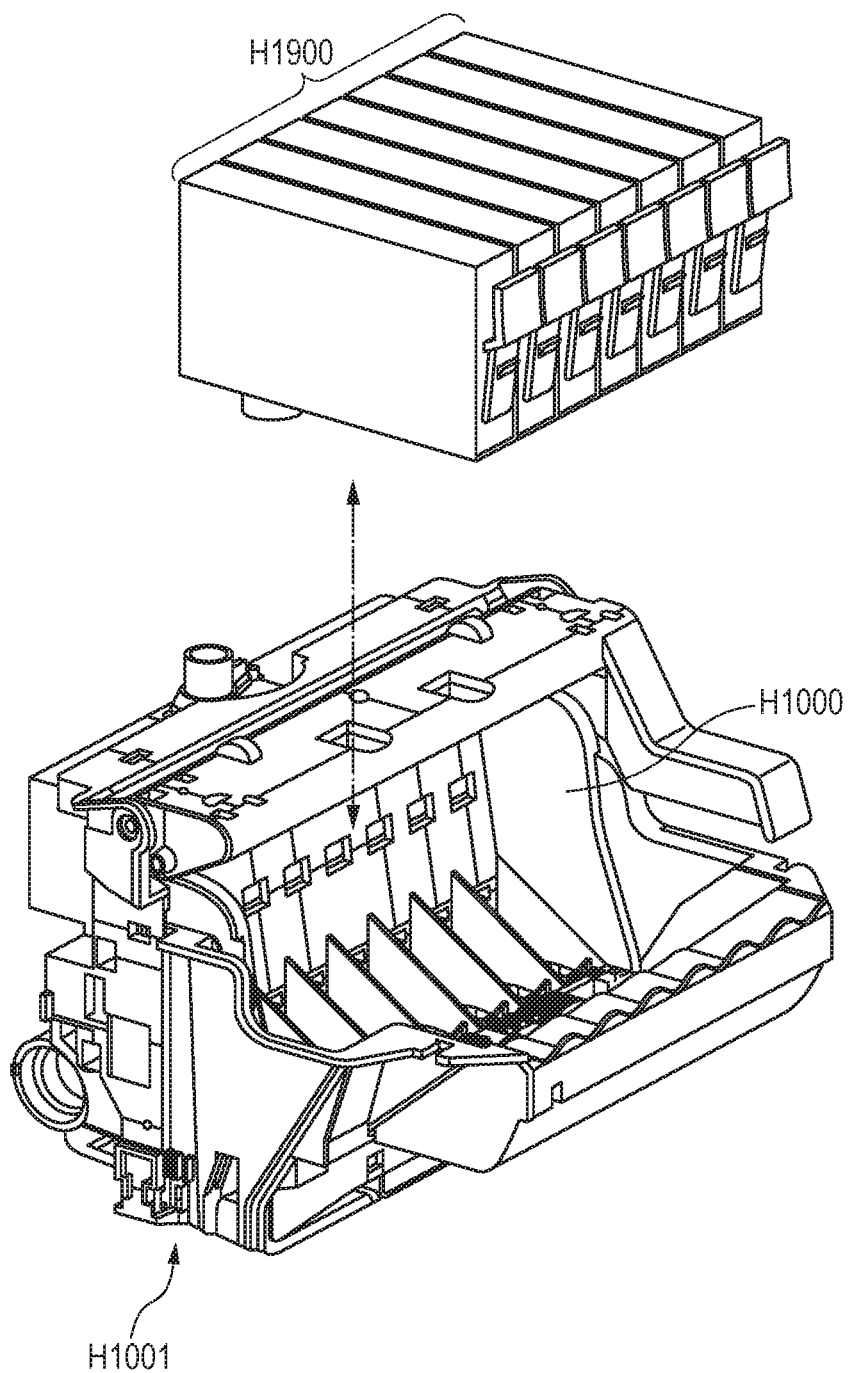
FIG. 2 is a perspective view illustrating an ink cartridge to be mounted on a head cartridge.

FIG. 2 is a perspective view illustrating ink cartridges H1900, which is an example of the ink cartridge of the invention, to be mounted on a head cartridge H1000. In FIG. 2, a plurality of ink cartridges H1900 corresponding to a plurality of inks is provided independently. The ink cartridges H1900 are each detachable from the head cartridge H1000. The ink cartridges H1900 can be attached to or detached from the head cartridge H1000 being mounted on a carriage M5000.

EXAMPLES

The invention will hereinafter be described more specifically by Examples and Comparative Examples. The invention is however not limited by the following examples insofar as it does not depart from the gist of the invention. With respect to the amount of components, "part(s)" and "%" are all based on mass unless otherwise specifically indicated.

Preparation of Aqueous Dispersion Liquid Containing Resin Particle

Aqueous dispersion liquids respectively containing resin particles 1 to 34 were prepared by the process described below. The composition and properties of a first resin constituting a first layer and a second resin constituting a second layer are shown in Tables 1 and 2. The term "specific unit" in Table 1 means a unit derived from a monomer containing a carboxy group, an alcoholic hydroxy group, or a silanolic hydroxy group. The proportion (%) of various units in Tables 1 and 2 is based on the total mass of the first resin and the second resin. Tables 1 and 2 also include the composition and properties of resin particles 35 to 38 synthesized by a process described later.

The THF-insoluble fraction of the first layer and the second layer was measured by synthesizing a resin corresponding to each layer by a process similar to that described below and making use of a liquid containing the resulting resin. The THF-insoluble fraction of a resin corresponding to the second layer was measured using a liquid containing a resin prepared in a manner similar to that described below, except that an aqueous potassium hydroxide solution was not added. Specifically, the THF-insoluble fraction was measured in the following procedure. First, a liquid containing a resin was dried and the resin in solid form was taken out. The resulting resin was added to THF so as to give a resin content of 0.5% by mass, followed by stirring at 25° C. for 24 hours. Then, an undissolved resin was weighed to calculate the THF-insoluble fraction (%) based on the following formula: [(mass of undissolved resin)/(mass of added resin)]×100.

A monomer mixture was obtained by mixing a monomer (unit: part) shown in the upper part of Table 1 and 2.0 parts of n-hexadecane (hydrophobe) followed by stirring the resulting mixture for 30 minutes. The resulting monomer mixture was added dropwise to 61.0 parts of a 5.0% aqueous solution of polyoxyethylene cetyl ether ("Nikkol BC15", trade name; product of Nikko Chemicals Co.), followed by stirring for 30 minutes to obtain a mixture. The resulting mixture was emulsified using an ultrasonic irradiator ("S-150D Digital Sonifier", trade name; product of Branson Co.) under the conditions of 400 W and 20 kHz for 3 hours to obtain an emulsified product. To the resulting emulsified product was added 0.2 parts of potassium persulfate (polymerization initiator) to conduct polymerization reaction at 80° C. for 4 hours in a nitrogen atmosphere, thereby obtaining a liquid containing a first resin. This first resin is a resin corresponding to the first layer of the resin particle.

After 72.0 parts of the resulting liquid containing the first resin was heated to 75° C. in a nitrogen atmosphere, 0.1 parts of potassium persulfate (polymerization initiator) was added to obtain a mixture containing the first resin. Apart from this, 7.9 parts of ion exchange water, and monomers (unit: part) and 3.0 parts of a surfactant (reactive or nonreactive) shown in Table 2 were mixed to obtain an emulsified product. The emulsified product thus obtained was added dropwise to the mixture containing the first resin over one hour. Then, the reaction mixture was heated to 85° C. and stirred for 2 hours to perform polymerization reaction. By the polymerization reaction, each monomer formed a second resin corresponding to the second layer of the resin particle. The reactive surfactant bonded to the second layer became "unit derived from a reactive surfactant" to form a third layer. After cooling to room temperature, adequate amounts of ion exchange water and an aqueous potassium hydroxide solution were added to obtain an aqueous dispersion liquid containing each resin particle and having a resin particle content of 15% and a pH of 8.5.

The resin particles thus synthesized each had the following layer constitution. The resin particles 1 to 34 had a first layer composed of the first resin and a second layer composed of the second resin in this order. The resin particles 1 to 9 and 11 to 34 each had, outside the second layer thereof, a third layer bonded to the second layer and composed of a unit derived from a reactive surfactant, but the resin particle 10 did not have the third layer. The resin particles thus synthesized were measured using the above-described method. They had the following properties. The resin particles 1 to 28 each had a volume-average particle diameter of within a range of from 50 to 300 nm, a THF-insoluble fraction of, as a whole resin particle, within a range of from 5 to 80%, a surface charge amount of within a range of from 1 to 50 μmol/m$^2$, and a glass transition temperature of within a range of from 0 to 200° C.

The resin particles 35 to 38 were synthesized in the following manners, respectively.

The resin particle 35: A resin particle having a first layer and a second layer in this order was synthesized in accordance with Preparation Example 1 of Japanese Patent Application Laid-Open No. 2008-179778.

The resin particle 36: A resin particle having a first layer, a second layer, and a third layer in this order was synthesized in accordance with the preparation process of a resin particle dispersion 1 of Japanese Patent Application Laid-Open No. 2014-101492.

The resin particle 37: A resin particle having a first layer, a second layer, and a third layer in this order was synthesized in accordance with Example 1 of Japanese Patent Application Laid-Open No. 2012-201692.

The resin particle 38: A resin particle having a first layer and a second layer in this order was synthesized by the preparation process for the aqueous resin emulsion 8 described in Japanese Patent Application Laid-Open No. 2015-034268.

TABLE 1

Composition and properties of first layer (first resin)

| | | No. of resin particle | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Monomer | 2-Ethylhexyl acrylate | | | | | | | | | | | | | | | | | | | | |
| | Cyclohexyl methacrylate | | | | | | | | | | | | | | | | | | | | |
| | n-Butyl methacrylate | 100 | 50 | 100 | 80 | 60 | 90 | 100 | 100 | 100 | | | | 39 | 38 | | | 35 | 34 | |
| | t-Butyl methacrylate | | | | | | | | | | | | | | | | | | | | |
| | n-Butyl acrylate | | | | 20 | 40 | | | | | | 100 | 10 | | | 50 | 95 | | | 50 |
| | Ethyl methacrylate | | 50 | | | | | | | | | | 10 | | | 49 | | | | 50 |
| | Methyl methacrylate | | | | | | | | | | | | 80 | 100 | 60 | 60 | | | 60 | 60 | |
| | Ethylene glycol dimethacrylate | | | | | | | | | | | | | | 1 | 2 | | | | | |
| | p-Divinylbenzene | | | | | | | | | | | | | | | | | | | | |
| | Styrene | | | | | | 10 | | | | | | | | | | 1 | | | | |
| | α-Methylstyrene | | | | | | | | | | | | | | | | | | | | |
| | Benzyl acrylate | | | | | | | | | | | | | | | | | 2 | | | |
| | 2-Phenoxyethyl methacrylate | | | | | | | | | | | | | | | | | 3 | | | |
| | Sodium styrenesulfonate | | | | | | | | | | | | | | | | | | | | |
| | Methacrylic acid | | | | | | | | | | | | | | | | | | | 5 | 6 |
| | Acrylic acid | | | | | | | | | | | | | | | | | | | | |
| | Acrylamide | | | | | | | | | | | | | | | | | | | | |

TABLE 1-continued

Composition and properties of first layer (first resin)

| Property | | | | | | | | | | | | | | | | | | | | |
|---|---|---|---|---|---|---|---|---|---|---|---|---|---|---|---|---|---|---|---|---|
| Proportion of crosslinkable unit (%) | 0 | 0 | 0 | 0 | 0 | 0 | 0 | 0 | 0 | 0 | 0 | 0 | 1 | 2 | 0 | 0 | 0 | 0 | 0 |
| Proportion of aromatic unit (%) | 0 | 0 | 0 | 0 | 0 | 10 | 0 | 0 | 0 | 0 | 0 | 0 | 0 | 0 | 1 | 5 | 0 | 0 | 0 |
| Proportion of specific unit (%) | 0 | 0 | 0 | 0 | 0 | 0 | 0 | 0 | 0 | 0 | 0 | 0 | 0 | 0 | 0 | 0 | 5 | 6 | 0 |
| THF-insoluble fraction (%) | 1 | 1 | 1 | 1 | 1 | 6 | 1 | 1 | 1 | 1 | 10 | 14 | 10 | 13 | 4 | 2 | 10 | 11 | 4 |

| | | No. of resin particle | | | | | | | | | | | | | | | | | | |
|---|---|---|---|---|---|---|---|---|---|---|---|---|---|---|---|---|---|---|---|---|
| | | 20 | 21 | 22 | 23 | 24 | 25 | 26 | 27 | 28 | 29 | 30 | 31 | 32 | 33 | 34 | 35 | 36 | 37 | 38 |
| Monomer | 2-Ethylhexyl acrylate | | | | | | | | | | | | | | | | | | | |
| | Cyclohexyl methacrylate | | | | | | | | | | | | | | | | | | 5 | |
| | n-Butyl methacrylate | | 70 | 70 | | 100 | 100 | 100 | 100 | 100 | 85 | 100 | 100 | 100 | 100 | 55 | | 100 | | |
| | t-Butyl methacrylate | | | | | | | | | | | | | | | | | | 13 | |
| | n-Butyl acrylate | 50 | | | 100 | | | | | | | | | | | | | | | |
| | Ethyl methacrylate | 50 | | | | | | | | | | | | | | | | | 65 | |
| | Methyl methacrylate | | 30 | 30 | | | | | | | | | | | | | | | | 86 |
| | Ethylene glycol dimethacrylate | | | | | | | | | | | | | | | 6 | | | 12 | |
| | p-Divinylbenzene | | | | | | | | | | | | | | | | 5 | | | |
| | Styrene | | | | | | | | | 15 | | | | | | 32 | 95 | | | 10 |
| | α-Methylstyrene | | | | | | | | | | | | | | | | | | 3 | |
| | Benzyl acrylate | | | | | | | | | | | | | | | | | | | |
| | 2-Phenoxyethyl methacrylate | | | | | | | | | | | | | | | | | | | |
| | Sodium styrenesulfonate | | | | | | | | | | | | | | | | | | 1 | |
| | Methacrylic acid | | | | | | | | | | | | | | | 7 | | | | |
| | Acrylic acid | | | | | | | | | | | | | | | | | | | 4 |
| | Acrylamide | | | | | | | | | | | | | | | | | | 1 | |
| Property | Proportion of crosslinkable unit (%) | 0 | 0 | 0 | 0 | 0 | 0 | 0 | 0 | 0 | 0 | 0 | 0 | 0 | 0 | 6 | 5 | 0 | 12 | 0 |
| | Proportion of aromatic unit (%) | 0 | 0 | 0 | 0 | 0 | 0 | 0 | 0 | 0 | 15 | 0 | 0 | 0 | 0 | 32 | 100 | 0 | 4 | 10 |
| | Proportion of specific unit (%) | 0 | 0 | 0 | 0 | 0 | 0 | 0 | 0 | 0 | 0 | 0 | 0 | 0 | 0 | 7 | 0 | 0 | 0 | 4 |
| | THF-insoluble fraction (%) | 4 | 8 | 8 | 1 | 1 | 1 | 1 | 1 | 1 | 7 | 1 | 1 | 1 | 1 | 21 | 20 | 1 | 42 | 4 |

TABLE 2

Composition and properties of second layer (second resin) and third layer

| | | No. of resin particle | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Monomer | Stearyl methacrylate | | | | | | | | | | | | | | | | | | | |
| | 2-Ethylhexyl acrylate | | | | | | | | | | | | | | | | | | | |
| | n-Butyl methacrylate | 55 | | | 22 | | 52 | 38 | 5 | 58 | 14 | | 7 | 15 | 15 | | 42 | 15 | 15 | |
| | t-Butyl methacrylate | | | | | | | | | | | | | | | | | | | |
| | n-Butyl acrylate | | | | | | | | | | | | | | | | | | | |
| | Ethyl methacrylate | | 32 | 20 | 27 | | | | | | 20 | 23 | | | 10 | | | | | 8 |
| | Methyl methacrylate | | | | | | | | | | | | | | | | | | | |
| | 1,4-Butanediol dimethacrylate | | | | | 23 | 12 | | | 4 | 20 | | 10 | 30 | 30 | 35 | | 30 | 30 | |
| | Ethylene glycol dimethacrylate | 6 | 8 | 10 | 12 | | | 28 | 5 | | 28 | | | | | | 20 | | | 2 |
| | 1,1,1-Trimethylolpropane triacrylate | | | | | | | | | | | | | | | | | | | |
| | Styrene | 32 | 40 | 60 | | 20 | 24 | | | | 20 | | | 40 | 40 | | | 40 | 40 | |
| | α-Methylstyrene | | | | | | | 31 | 20 | | | 20 | | | | | 26 | | | 85 |
| | Benzyl methacrylate | | | | | | | | | | | | | | | | | | | |
| | Benzyl acrylate | | | | | 22 | | | | | | 20 | | 20 | | 25 | | | | |
| | 2-Phenoxyethyl methacrylate | | | | 24 | | | | 28 | | | 10 | 21 | | | | | | | |
| | Sodium styrenesulfonate | | | | | | | | | | | | | | | | | | | |

TABLE 2-continued

Composition and properties of second layer (second resin) and third layer

|  |  |  |  |  |  |  |  |  |  |  |  |  |  |  |  |  |  |  |  |
|---|---|---|---|---|---|---|---|---|---|---|---|---|---|---|---|---|---|---|---|
|  | Methacrylic acid | 7 | 20 | 10 |  | 35 | 12 |  |  |  |  |  | 42 | 15 | 15 | 30 |  | 15 | 15 | 5 |
|  | Acrylic acid |  |  |  | 15 |  |  | 3 | 70 | 10 | 6 | 19 |  |  |  |  | 12 |  |  | 5 |
|  | 2-(Dimethylamino)ethyl methacrylate |  |  |  |  |  |  |  |  |  |  |  |  |  |  |  |  |  |  |  |
|  | Polypropylene glycol monomethacrylate |  |  |  |  |  |  |  |  |  |  |  |  |  |  |  |  |  |  |  |
|  | Polyethylene glycol monomethacrylate |  |  |  |  |  |  |  |  |  |  |  |  |  |  |  |  |  |  |  |
|  | Acrylamide |  |  |  |  |  |  |  |  |  |  |  |  |  |  |  |  |  |  |  |
| Surfactant | Aqualon KH-05 | 3 | 3 | 3 | 3 |  | 3 | 3 | 3 | 3 |  | 3 | 3 | 3 | 3 | 3 | 3 | 3 | 3 | 3 |
|  | Aqualon KH-10 |  |  |  |  |  |  |  |  |  |  |  |  |  |  |  |  |  |  |  |
|  | Adeka Reasoap ER-20 |  |  |  |  | 3 |  |  |  |  |  |  |  |  |  |  |  |  |  |  |
|  | Latemul PD-104 |  |  |  |  |  |  |  |  |  |  |  |  |  |  |  |  |  |  |  |
|  | Latemul PD-105 |  |  |  |  |  |  |  |  |  |  |  |  |  |  |  |  |  |  |  |
|  | Nikkol BC15 |  |  |  |  |  |  |  |  |  | 3 |  |  |  |  |  |  |  |  |  |
| Property | Proportion of ionic unit (%) | 7 | 20 | 10 | 15 | 35 | 12 | 3 | 70 | 10 | 6 | 19 | 42 | 15 | 15 | 30 | 12 | 15 | 15 | 5 |
|  | Proportion of crosslinkable unit (%) | 6 | 8 | 10 | 12 | 23 | 12 | 28 | 5 | 4 | 20 | 28 | 10 | 30 | 30 | 35 | 20 | 30 | 30 | 2 |
|  | Proportion of aromatic unit (%) | 32 | 40 | 60 | 24 | 42 | 24 | 31 | 20 | 28 | 40 | 30 | 41 | 40 | 40 | 25 | 26 | 40 | 40 | 85 |
|  | THF-insoluble fraction (%) | 21 | 34 | 47 | 38 | 59 | 41 | 68 | 17 | 10 | 60 | 72 | 19 | 70 | 70 | 78 | 66 | 70 | 70 | 14 |

| | | No. of resin particle | | | | | | | | | | | | | | | | | | |
|---|---|---|---|---|---|---|---|---|---|---|---|---|---|---|---|---|---|---|---|---|
| | | 20 | 21 | 22 | 23 | 24 | 25 | 26 | 27 | 28 | 29 | 30 | 31 | 32 | 33 | 34 | 35 | 36 | 37 | 38 |
| Monomer | Stearyl methacrylate |  |  |  |  |  |  |  |  |  |  |  |  |  |  |  | 10 |  |  |  |
|  | 2-Ethylhexyl acrylate |  |  |  |  |  |  |  |  |  |  |  |  |  |  |  |  |  |  |  |
|  | n-Butyl methacrylate |  |  | 14 |  |  |  |  |  | 52 |  | 39 |  | 70 | 100 |  | 62 |  |  |  |
|  | t-Butyl methacrylate |  |  |  |  |  |  |  |  |  |  |  |  |  |  |  |  |  | 8 |  |
|  | n-Butyl acrylate |  |  |  |  |  |  |  |  |  |  |  |  |  |  |  |  |  |  |  |
|  | Ethyl methacrylate | 7 | 12 | 7 | 20 | 46 | 41 | 4 |  | 12 | 54 |  |  |  |  |  |  |  |  |  |
|  | Methyl methacrylate |  |  |  |  |  |  |  |  |  |  |  |  |  |  |  |  |  |  | 86 |
|  | 1,4-Butanediol dimethacrylate |  |  |  | 15 | 15 |  |  | 30 | 12 | 24 |  |  |  | 3 |  | 19 |  |  |  |
|  | Ethylene glycol dimethacrylate | 3 | 50 | 55 |  |  | 3 | 3 |  |  |  | 28 | 5 |  |  |  |  |  | 9 |  |
|  | 1,1,1-Trimethylolpropane triacrylate |  |  |  | 20 |  |  |  |  |  |  |  |  |  |  |  |  |  |  |  |
|  | Styrene |  |  |  | 20 |  |  | 90 | 94 |  | 24 |  |  |  |  |  | 10 |  |  | 10 |
|  | α-Methylstyrene | 85 |  |  |  | 15 | 20 |  |  |  |  | 31 | 20 |  |  |  |  | 16 |  |  |
|  | Benzyl methacrylate |  |  |  |  |  |  |  |  |  |  |  |  |  |  |  | 38 | 65 |  |  |
|  | Benzyl acrylate |  | 30 | 30 | 20 |  |  |  |  | 46 |  |  |  |  |  |  |  |  |  |  |
|  | 2-Phenoxyethyl methacrylate |  |  |  |  |  |  |  |  |  |  |  |  |  | 22 |  |  |  |  |  |
|  | Sodium styrenesulfonate |  |  |  |  |  |  |  |  |  |  |  |  |  |  |  |  |  | 1 |  |
|  | Methacrylic acid |  |  |  |  | 24 | 24 |  |  | 12 |  |  |  |  |  |  | 12 | 19 |  |  |
|  | Acrylic acid | 5 | 8 | 8 | 6 |  |  | 3 | 3 |  |  | 22 | 2 | 75 | 5 |  |  |  |  | 4 |
|  | 2-(Dimethylamino)ethyl methacrylate |  |  |  |  |  |  |  |  | 12 |  |  |  |  |  |  |  |  |  |  |
|  | Polypropylene glycol monomethacrylate |  |  |  |  |  |  |  |  |  |  |  |  |  |  |  | 15 |  |  |  |
|  | Polyethylene glycol monomethacrylate |  |  |  |  |  |  |  |  |  |  |  |  |  |  |  | 15 |  |  |  |
|  | Acrylamide |  |  |  |  |  |  |  |  |  |  |  |  |  |  |  |  |  | 1 |  |
| Surfactant | Aqualon KH-05 | 3 | 3 | 3 | 3 | 3 | 3 | 3 | 3 | 3 | 3 | 3 | 3 | 3 | 3 | 3 |  | 3 |  |  |
|  | Aqualon KH-10 |  |  |  |  |  |  |  |  |  |  |  |  |  |  |  |  |  |  | 3 |
|  | Adeka Reasoap ER-20 |  |  |  |  |  |  |  |  |  |  |  |  |  |  |  |  |  |  |  |
|  | Latemul PD-104 |  |  |  |  |  |  |  |  |  |  |  |  |  |  |  |  |  |  |  |
|  | Latemul PD-105 |  |  |  |  |  |  |  |  |  |  |  |  |  |  |  |  |  |  |  |
|  | Nikkol BC15 |  |  |  |  |  |  |  |  |  |  |  |  |  |  |  |  |  |  |  |
| Property | Proportion of ionic unit (%) | 5 | 8 | 8 | 6 | 24 | 24 | 3 | 3 | 12 | 12 | 22 | 2 | 75 | 5 | 0 | 12 | 19 | 1 | 4 |
|  | Proportion of crosslinkable unit (%) | 3 | 50 | 55 | 20 | 15 | 15 | 3 | 3 | 30 | 12 | 24 | 28 | 5 | 3 | 0 | 0 | 19 | 9 | 0 |
|  | Proportion of aromatic unit (%) | 85 | 30 | 30 | 40 | 15 | 20 | 90 | 94 | 46 | 24 | 0 | 31 | 20 | 22 | 0 | 48 | 0 | 82 | 10 |
|  | THF-insoluble fraction (%) | 14 | 94 | 98 | 75 | 52 | 55 | 18 | 18 | 68 | 41 | 74 | 66 | 18 | 7 | 1 | 1 | 58 | 23 | 4 |

Details of the surfactants indicated by trade name in Table 2 are as follows:
Aqualon KH-05 and Aqualon KH-10: reactive surfactant, Dai-ichi Kogyo Seiyaku Co.
Adeka Reasoap ER-20: reactive surfactant, product of Adeka Co.
Latemul PD-104 and Latemul PD-105: reactive surfactant, product of Kao Co.
Nikkol BC15: nonreactive surfactant, product of Nikko Chemicals Co.

In Table 1, each of p-divinylbenzene, styrene, α-methylstyrene, benzyl acrylate, 2-phenoxyethyl methacrylate and sodium styrenesulfonate corresponds to an aromatic-group-containing ethylenically unsaturated monomer. Each of ethylene glycol dimethacrylate and p-divinylbenzene corresponds to a crosslinkable monomer. Each of acrylic acid and methacrylic acid corresponds to carboxy-group-containing monomer.

In Table 2, each of p-divinylbenzene, styrene, α-methylstyrene, benzyl acrylate, 2-phenoxyethyl methacrylate and sodium styrenesulfonate corresponds to an aromatic-group-containing ethylenically unsaturated monomer. Each of sodium styrenesulfonate, methacrylic acid, acrylic acid and 2-(dimethylamino)ethyl methacrylate corresponds to an ionic-group-containing ethylenically unsaturated monomer. Each of 1,4-butanediol dimethacrylate, ethylene glycol dimethacrylate and 1,1,1-trimethylolpropane triacrylate corresponds to a crosslinkable monomer.

Preparation of Pigment Dispersion

A styrene/ethyl acrylate/acrylic acid copolymer having an acid value of 150 mg KOH/g and a weight-average molecular weight of 8,000 was neutralized with a 10% aqueous potassium hydroxide solution to obtain an aqueous resin solution having a resin content of 20.0%. Then, 30.0 parts of the aqueous resin solution, 20.0 parts of a pigment (carbon black, "Monarch 1100", trade name; product of Cabot Co.), and 50.0 parts of ion exchange water were mixed. The resulting mixture was dispersed for 5 hours using a batch-type vertical sand mill (product of Imex Co.) filled with 200 parts of zirconia beads having a particle diameter of 0.3 mm. Coarse particles were then removed by centrifugal treatment, followed by pressure filtration using a micro-filter having a pore size of 3.0 μm (product of Fujifilm Co.). By the above-described process, a pigment dispersion (pigment content: 20.0%, resin content: 6.0%) having the pigment dispersed in water by means of a resin dispersant was obtained.

Preparation of Ink

After components described below were mixed and stirred fully, the reaction mixture was subjected to pressure filtration through a microfilter (product of Fujifilm Co.) having a pore size of 3.0 μm to prepare an ink. The nonionic surfactant used was "Acetylenol E100" (trade name; product of Kawaken Fine Chemicals Co.).
Aqueous dispersion liquid of resin particle (of the kind shown in Table 3): 70.0%
Pigment dispersion: 10.0%
Glycerin: 10.0%
Diethylene glycol: 4.0%
Nonionic surfactant: 1.0%
Ion exchange water: 5.0%

Evaluation

A cartridge was filled with each ink obtained above and was set in an ink jet recording apparatus ("PIXUS Pro 9500", trade name: product of Canon Co.) having thereon a recording head for ejecting an ink by thermal energy. In the ink-jet recording apparatus, an image recorded with a resolution of 600 dpi×600 dpi under conditions of applying eight ink droplets each having a weight of 3.5 ng to a unit area of 1/600 inch×1/600 inch is defined as a recording duty of 100%. In the present invention, "A" and "B" are taken to be acceptable levels and "C" is taken to be an unacceptable level in the evaluation criteria of each evaluation item described below. Evaluation results are shown in Table 3.

Fixability

A recorded product was obtained by recording a solid image (200 mm×200 mm) having a recording duty of 100% on a recording medium ("OK Top Coat", trade name; basis weight: 127.9 g, product of Oji Paper Co.). Ten seconds after recording, Silbon paper was pressed against a portion of the solid image. The ink transferred and attached to the Silbon paper was observed visually to evaluate the fixability in accordance with the following evaluation criteria:
A: No ink attached to the Silbon paper.
B: Ink attached to the Silbon paper in the form of dots having a diameter of 1 mm or less.
C: Ink attached to the Silbon paper in the form of lines or dots having a diameter of more than 1 mm.

Abrasion Resistance

A recorded product was obtained by recoding a solid image (200 mm×200 mm) having a recording duty of 100% on a recording medium ("OK Top Coat", trade name; basis weight: 127.9 g, product of Oji Paper Co.). One hour after recording, the solid image was subjected to an abrasion test using a Gakushin-type abrasion resistance tester (product of Imoto Machinery Co.) in accordance with JIS L 0849 under conditions of ten reciprocating motions with a load of 500 g. Whether or not the solid image had a scratch thereon and whether or not the white background of the recording medium could be recognized were visually observed and abrasion resistance was evaluated in accordance with the following evaluation criteria:
A: No scratch was found on the solid image.
B: Slight scratch was found on the solid image, but white background of the recording medium was not recognized.
C: Scratch was found on the solid image and also the white background of the recording medium was recognized.

TABLE 3

Evaluation condition and result

| | | No. of resin particle | Fixability | Abrasion resistance |
|---|---|---|---|---|
| Example | 1 | 1 | A | A |
| | 2 | 2 | A | A |
| | 3 | 3 | A | A |
| | 4 | 4 | A | A |
| | 5 | 5 | A | A |
| | 6 | 6 | B | B |
| | 7 | 7 | A | A |
| | 8 | 8 | A | A |
| | 9 | 9 | A | A |
| | 10 | 10 | B | B |
| | 11 | 11 | A | A |
| | 12 | 12 | A | B |
| | 13 | 13 | A | A |
| | 14 | 14 | A | B |
| | 15 | 15 | A | A |
| | 16 | 16 | B | B |
| | 17 | 17 | A | A |
| | 18 | 18 | A | B |
| | 19 | 19 | B | B |
| | 20 | 20 | A | A |
| | 21 | 21 | A | A |
| | 22 | 22 | B | B |
| | 23 | 23 | B | B |
| | 24 | 24 | B | B |
| | 25 | 25 | A | A |
| | 26 | 26 | A | A |
| | 27 | 27 | B | B |
| | 28 | 28 | B | B |
| Comparative Example | 1 | 29 | C | C |
| | 2 | 30 | C | C |
| | 3 | 31 | C | C |
| | 4 | 32 | C | C |
| | 5 | 33 | C | C |
| | 6 | 34 | C | C |
| | 7 | 35 | C | C |
| | 8 | 36 | C | C |
| | 9 | 37 | C | C |
| | 10 | 38 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-103524, filed May 21, 2015, which is hereby incorporated by reference herein in its entirety.

What is claimed is:

1. An aqueous ink for ink jet comprising a resin particle, wherein the resin particle has a first layer and a second layer in this order from the inside to the outside thereof, wherein the first layer is composed of a first resin, a proportion of a unit derived from an aromatic-group-containing ethylenically unsaturated monomer in the first resin being 10% by mass or less, and wherein the second layer has a tetrahydrofuran-insoluble fraction of 10% by mass or more and is composed of a second resin having a unit derived from an aromatic-group-containing ethylenically unsaturated monomer and a unit derived from an ionic-group-containing ethylenically unsaturated monomer, a proportion of the unit derived from the ionic-group-containing ethylenically unsaturated monomer in the second resin being 3% by mass or more to 70% by mass or less.

2. The aqueous ink according to claim 1, wherein the resin particle further has a third layer composed of a unit derived from a reactive surfactant bonded to the second layer.

3. The aqueous ink according to claim 2, wherein the reactive surfactant has an ethylenically unsaturated bond.

4. The aqueous ink according to claim 1, wherein a tetrahydrofuran-insoluble fraction of the first layer is 10% by mass or less.

5. The aqueous ink according to claim 2, wherein the reactive surfactant comprises a polyoxyalkylene alkyl ether having, bonded to the molecule thereof or at an end of the molecule thereof, at least one group selected from the group consisting of a (meth)acryloyl group, a maleyl group, a vinyl group, and an allyl group.

6. The aqueous ink according to claim 1, wherein a proportion of a unit derived from a crosslinkable monomer in the first resin is 1% by mass or less.

7. The aqueous ink according to claim 1, wherein a proportion of the unit derived from an aromatic-group-containing ethylenically unsaturated monomer in the first resin is 1% by mass or less.

8. The aqueous ink according to claim 1, wherein in the first resin a proportion of a unit derived from a monomer including at least one functional group selected from the group consisting of a carboxy group, an alcoholic hydroxy group, and a silanolic hydroxy group is 5% by mass or less.

9. The aqueous ink according to claim 1, wherein the tetrahydrofuran-insoluble fraction of the second layer is 10% by mass or more to 95% by mass or less.

10. The aqueous ink according to claim 1, wherein the second resin has a unit derived from a crosslinkable monomer, and a proportion of the unit derived from a crosslinkable monomer in the second resin is 3% by mass or more to 50% by mass or less.

11. The aqueous ink according to claim 10, wherein the crosslinkable monomer of the second resin has two ethylenically unsaturated bonds.

12. The aqueous ink according to claim 11, wherein the crosslinkable monomer of the second resin comprises at least one selected from the group consisting of 1,4-butanediol di(meth)acrylate, ethylene glycol di(meth)acrylate, diethylene glycol di(meth)acrylate, triethylene glycol di(meth)acrylate, and polyethylene glycol di(meth)acrylate.

13. The aqueous ink according to claim 1, wherein a proportion of the unit derived from an aromatic-group-containing ethylenically unsaturated monomer in the second resin is 20% by mass or more to 90% by mass or less.

14. The aqueous ink according to claim 1, wherein the ionic group of the ionic-group-containing ethylenically unsaturated monomer in the second layer is a carboxy group.

15. The aqueous ink according to claim 1, wherein a proportion of a unit derived from a non-crosslinkable monomer in the first resin is 95% by mass or more.

16. The aqueous ink according to claim 15, wherein the non-crosslinkable monomer in the first resin has one ethylenically unsaturated bond.

17. The aqueous ink according to claim 1, wherein the THF-insoluble fraction of the second layer is higher than that of the first layer.

18. The aqueous ink according to claim 1, wherein a content of the resin particle in the aqueous ink is 3% by mass or more to 20% by mass or less, based on the total mass of the aqueous ink.

19. An ink cartridge comprising an ink and an ink storage portion for storing the ink,
wherein the ink is an aqueous ink for ink jet comprising a resin particle,
wherein the resin particle has a first layer and a second layer in this order from the inside to the outside thereof,
wherein the first layer is composed of a first resin, a proportion of a unit derived from an aromatic-group-containing ethylenically unsaturated monomer in the first resin being 10% by mass or less, and
wherein the second layer has a tetrahydrofuran-insoluble fraction of 10% by mass or more and is composed of a second resin having a unit derived from an aromatic-group-containing ethylenically unsaturated monomer and a unit derived from an ionic-group-containing ethylenically unsaturated monomer, a proportion of the unit derived from the ionic-group-containing ethylenically unsaturated monomer in the second resin being 3% by mass or more to 70% by mass or less.

20. An ink jet recording method comprising ejecting an ink from an ink jet recording head to record an image on a recording medium,
wherein the ink is an aqueous ink for ink jet comprising a resin particle,
wherein the resin particle has a first layer and a second layer in this order from the inside to the outside thereof,
wherein the first layer is composed of a first resin, a proportion of a unit derived from an aromatic-group-containing ethylenically unsaturated monomer in the first resin being 10% by mass or less, and
wherein the second layer has a tetrahydrofuran-insoluble fraction of 10% by mass or more and is composed of a second resin having a unit derived from an aromatic-group-containing ethylenically unsaturated monomer and a unit derived from an ionic-group-containing ethylenically unsaturated monomer, a proportion of the unit derived from the ionic-group-containing ethylenically unsaturated monomer in the second resin being 3% by mass or more to 70% by mass or less.

21. The ink jet recording method according to claim 20, wherein the recording head is of a system of ejecting the ink by action of thermal energy.

* * * * *